United States Patent
Okamoto et al.

(10) Patent No.: US 11,364,821 B2
(45) Date of Patent: Jun. 21, 2022

(54) SEAT LIFTER

(71) Applicant: TOYOTA BOSHOKU KABUSHIKI KAISHA, Aichi-ken (JP)

(72) Inventors: Naoya Okamoto, Aichi-ken (JP); Sho Kume, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/196,696

(22) Filed: Mar. 9, 2021

(65) Prior Publication Data
US 2021/0284047 A1  Sep. 16, 2021

(30) Foreign Application Priority Data

Mar. 11, 2020 (JP) .............................. JP2020-042234

(51) Int. Cl.
| | |
|---|---|
| *B60N 2/18* | (2006.01) |
| *B60N 2/07* | (2006.01) |
| *B60N 2/02* | (2006.01) |

(52) U.S. Cl.
CPC ......... *B60N 2/1867* (2013.01); *B60N 2/0224* (2013.01); *B60N 2/0722* (2013.01); *B60N 2/1814* (2013.01)

(58) Field of Classification Search
CPC .. B60N 2/1867; B60N 2/0224; B60N 2/0722; B60N 2/1814; B60N 2002/024; B60N 2/0232; B60N 2/1655; B60N 2/1615
See application file for complete search history.

(56) References Cited

U.S. PATENT DOCUMENTS

| | | | | |
|---|---|---|---|---|
| 6,264,275 B1* | 7/2001 | Frohnhaus | ........... | B60N 2/1615 297/344.12 |
| 7,306,285 B2* | 12/2007 | Schuler | ................ | B60N 2/1615 297/344.17 |
| 2010/0060061 A1* | 3/2010 | Koga | .................. | B60N 2/1803 297/344.1 |
| 2011/0163585 A1* | 7/2011 | Beneker | ............... | B60N 2/0232 297/344.15 |
| 2014/0183919 A1* | 7/2014 | Hoffmann | .............. | B60N 2/933 297/362 |

FOREIGN PATENT DOCUMENTS

JP   2019-077336 A   5/2019

* cited by examiner

*Primary Examiner* — Milton Nelson, Jr.
(74) *Attorney, Agent, or Firm* — Greenblum & Bernstein, P.L.C.

(57) ABSTRACT

A seat lifter includes: an inner link for changing a height position of an inner lower arm with respect to a floor of a vehicle; an outer link for changing a height position of an outer lower area with respect to the floor; a coupling rod that couples the inner link to the outer link; a planetary gear mechanism capable of causing the coupling rod to rotate relative to the inner lower arm and the outer lower arm; a drive unit capable of driving the planetary gear mechanism; and a power transmission rod that transmits power of the drive unit to the planetary gear mechanism. The planetary gear mechanism is disposed between the inner lower arm and the outer lower arm. The drive unit is disposed outside the inner lower arm in the width direction or outside the outer lower arm in the width direction.

8 Claims, 9 Drawing Sheets

SEAT LIFTER

This nonprovisional application is based on Japanese Patent Application No. 2020-042234 filed on Mar. 11, 2020 with the Japan Patent Office, the entire contents of which are hereby incorporated by reference.

BACKGROUND

Field

The present disclosure relates to a seat lifter.

Description of the Background Art

A seat lifter using a planetary gear mechanism is conventionally known. Japanese Patent Laying-Open No. 2019-077336, for example, discloses a seat lifter including: a pair of right and left side frames; a pair of right and left sliders; a pair of right and left rear links; a pair of right and left front links; a pair of right and left planetary gear mechanisms each connected to each of the rear links; a coupling shaft that couples the planetary gear mechanisms to each other; and an operation force transmission unit that transmits operation force to the left planetary gear mechanism.

Each planetary gear mechanism includes: a sun gear that rotates by receiving the operation force from the operation force transmission unit; three planetary gears that revolve around the sun gear while rotating on their axes; and a fixed internal gear fixed to the side frame. The rear link has a different number of internal teeth than the fixed internal gear, and functions as a movable internal gear. Thus, driving of the operation force transmission unit effects rotation of the pair of right and left sun gears and the right and left planetary gears. This causes each rear link (movable internal gear) to rotate about a central axis of the sun gear with respect to the fixed internal gear, due to the difference in the number of internal teeth between the rear link and the fixed internal gear. As a result, the right and left side frames move up and down with respect to the sliders.

SUMMARY

In the seat lifter described in Japanese Patent Laying-Open No. 2019-077336, the planetary gear mechanism provided on the outer side in a width direction of a vehicle partially protrudes outward from the rear link, and the operation force transmission unit is disposed further outside the protrusion, resulting in a great amount of outward protrusion of the planetary gear mechanism and the operation force transmission unit from the side frame.

An object of the present disclosure is to provide a seat lifter capable of reducing an amount of outward protrusion of a planetary gear mechanism and a drive unit in a width direction of a vehicle.

A seat lifter according to an aspect of the present disclosure includes: an inner link for changing a height position of an inner lower arm with respect to a floor of a vehicle, the inner lower arm being disposed on an inner side in a width direction of the vehicle; an outer link for changing a height position of an outer lower arm with respect to the floor, the outer lower arm being disposed outside the inner lower arm in the width direction; a coupling rod that couples the inner link to the outer link so as to cause the inner link and the outer link to rotate together; a planetary gear mechanism connected to the coupling rod and capable of causing the coupling rod to rotate relative to the inner lower arm and the outer lower arm; a drive unit capable of driving the planetary gear mechanism; and a power transmission rod that transmits power of the drive unit to the planetary gear mechanism, the planetary gear mechanism being disposed between the inner lower arm and the outer lower arm, and the drive unit being disposed outside the inner lower arm in the width direction or outside the outer lower arm in the width direction.

DESCRIPTION OF THE PREFERRED EMBODIMENTS

Figure 1:
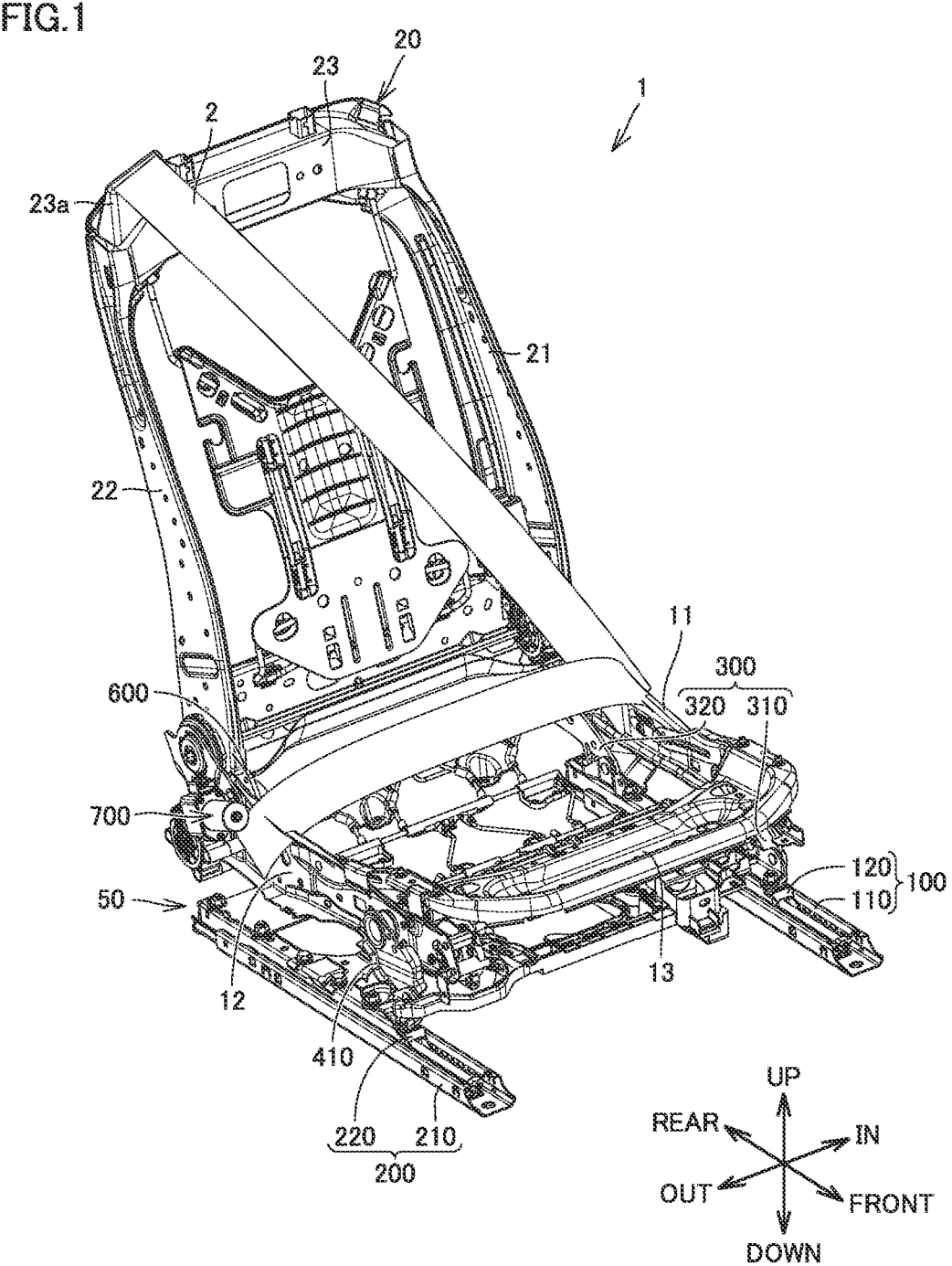
FIG. 1 is a perspective view schematically showing a seat frame in one embodiment of the present disclosure.

An embodiment of the present disclosure will be described with reference to the drawings. In the drawings referred to below, the same or corresponding components are designated by the same numbers.

FIG. 1 is a perspective view schematically showing a seat frame in one embodiment of the present disclosure. As shown in FIG. 1, a seat frame 1 in the present embodiment includes a cushion frame 10, a back frame 20, and a seat lifter 50. This seat frame 1 functions as a frame of a vehicle seat, particularly of an automobile seat.

Cushion frame 10 is formed as a framework of a seat cushion. Cushion frame 10 includes an inner lower arm 11, an outer lower arm 12, and a front panel 13.

Inner lower arm 11 is disposed on an inner side in a width direction of the vehicle. Inner lower arm 11 is shaped to extend in a fore/aft direction of the vehicle.

Outer lower arm 12 is disposed outside inner lower arm 11 in the width direction. Outer lower arm 12 is shaped to extend in the fore/aft direction of the vehicle.

Front panel 13 couples a front end portion of inner lower arm 11 to a front end portion of outer lower arm 12.

Back frame 20 is formed as a framework of a seat back. Back frame 20 is tillable with respect to cushion frame 10. Back frame 20 includes an inner side frame 21, an outer side frame 22, and an upper frame 23.

Inner side frame 21 is connected to a rear end portion of inner lower arm 11. Inner side frame 21 is shaped to extend upward from the rear end portion of inner lower arm 11. Inner side frame 21 is tiltable about its lower end portion with respect to inner lower arm 11.

Outer side frame 22 is connected to a rear end portion of outer lower arm 12. Outer side frame 22 is shaped to extend upward from the rear end portion of outer lower arm 12.

Outer side frame 22 is tiltable about its lower end portion with respect to outer lower arm 12.

Upper frame 23 couples upper end portions of inner side frame 21 and outer side frame 22 to each other. An outer end portion of upper frame 23, that is, an upper portion of outer side frame 22, is provided with a belt insertion portion 23a through which a seat belt 2 is inserted.

Seat lifter 50 is connected to cushion frame 10. Seat lifter 50 is a mechanism that changes a height position of cushion frame 10 with respect to a floor of the vehicle.

Figure 2:
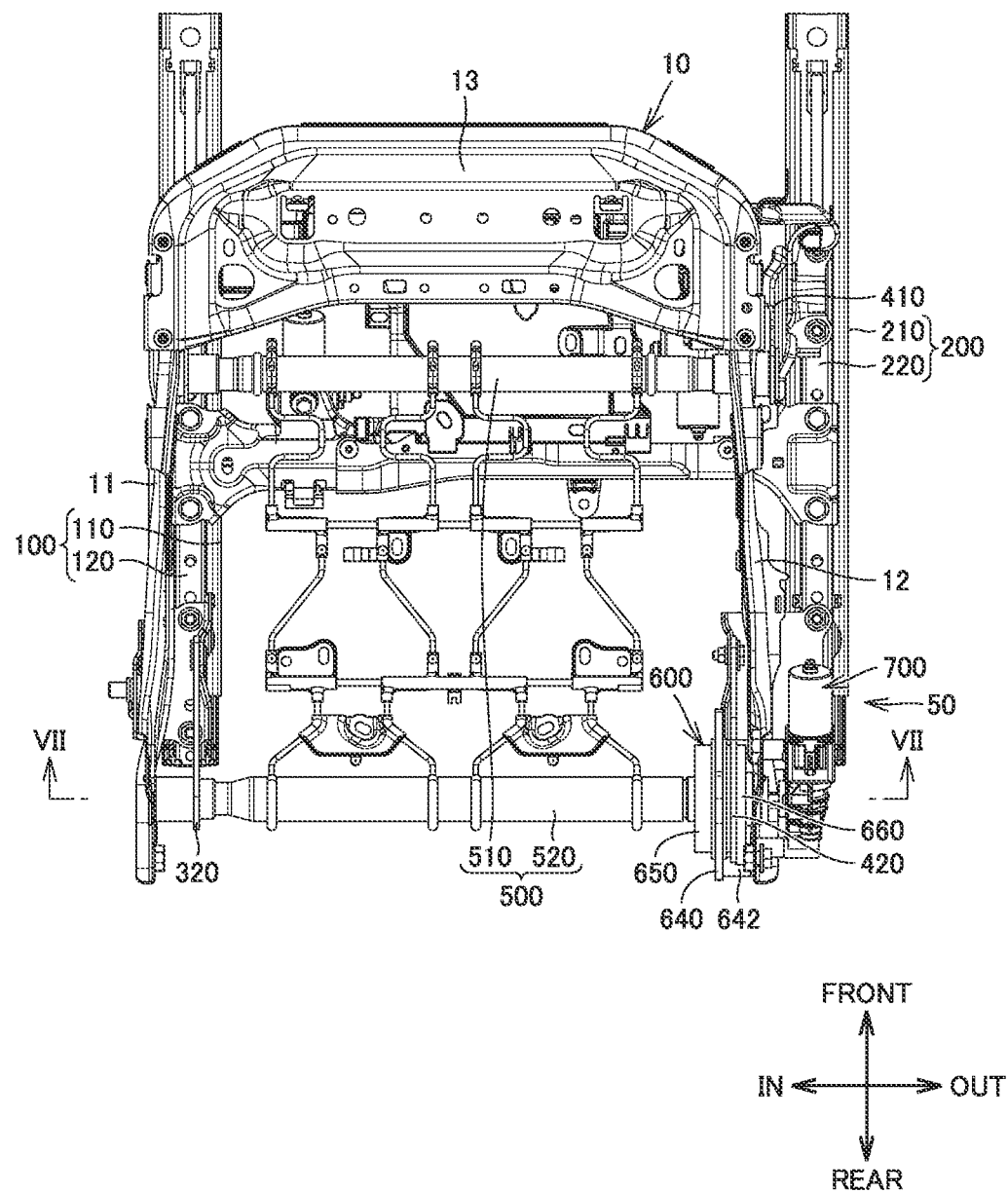
FIG. 2 is a plan view of a cushion frame and a seat lifter.
Figure 3:
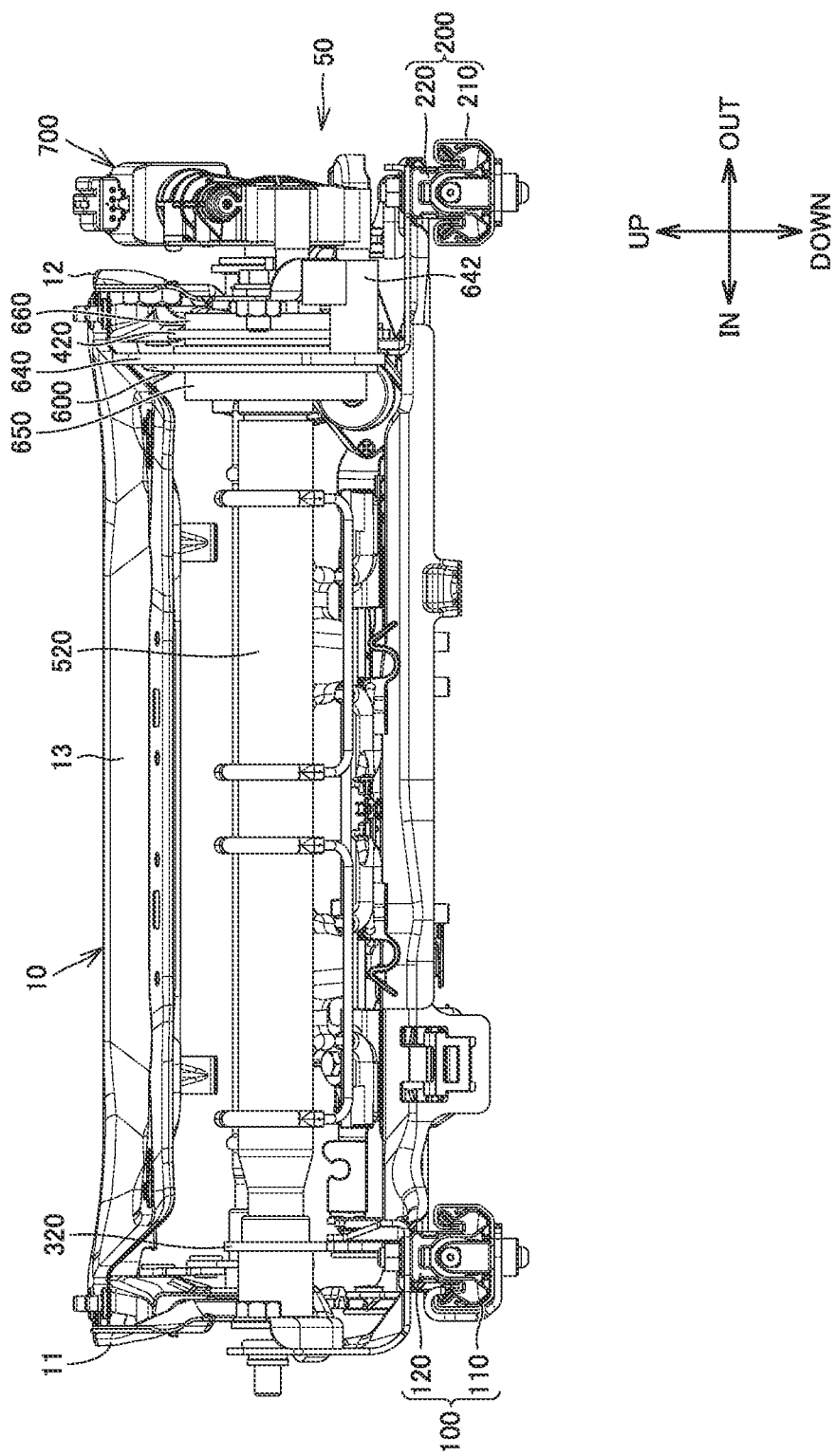
FIG. 3 is a rear view of the cushion frame and the seat lifter.
Figure 4:
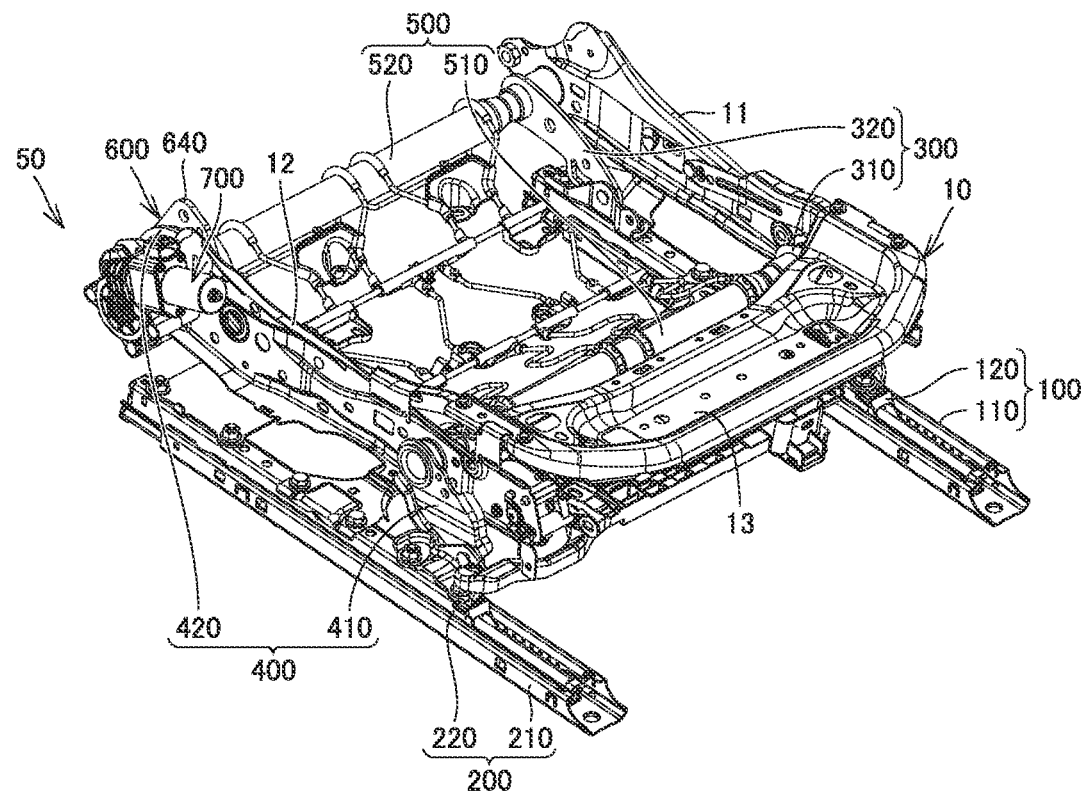
FIG. 4 is a perspective view of the cushion frame and the seat lifter.
Figure 5:
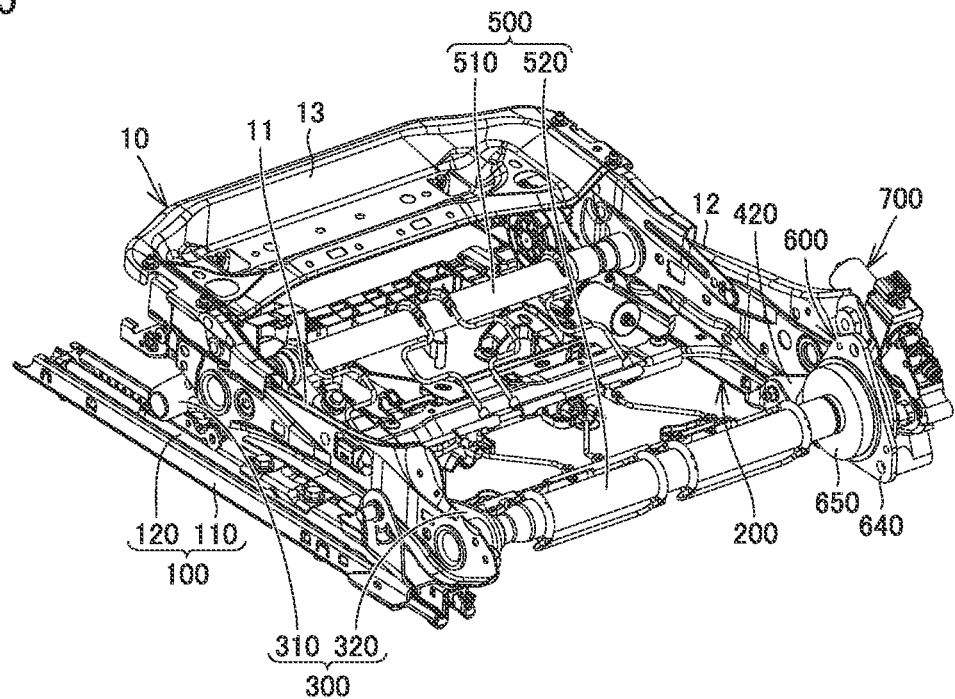
FIG. 5 is a perspective view of the cushion frame and the seat lifter from a different angle than in FIG. 4.
Figure 6:
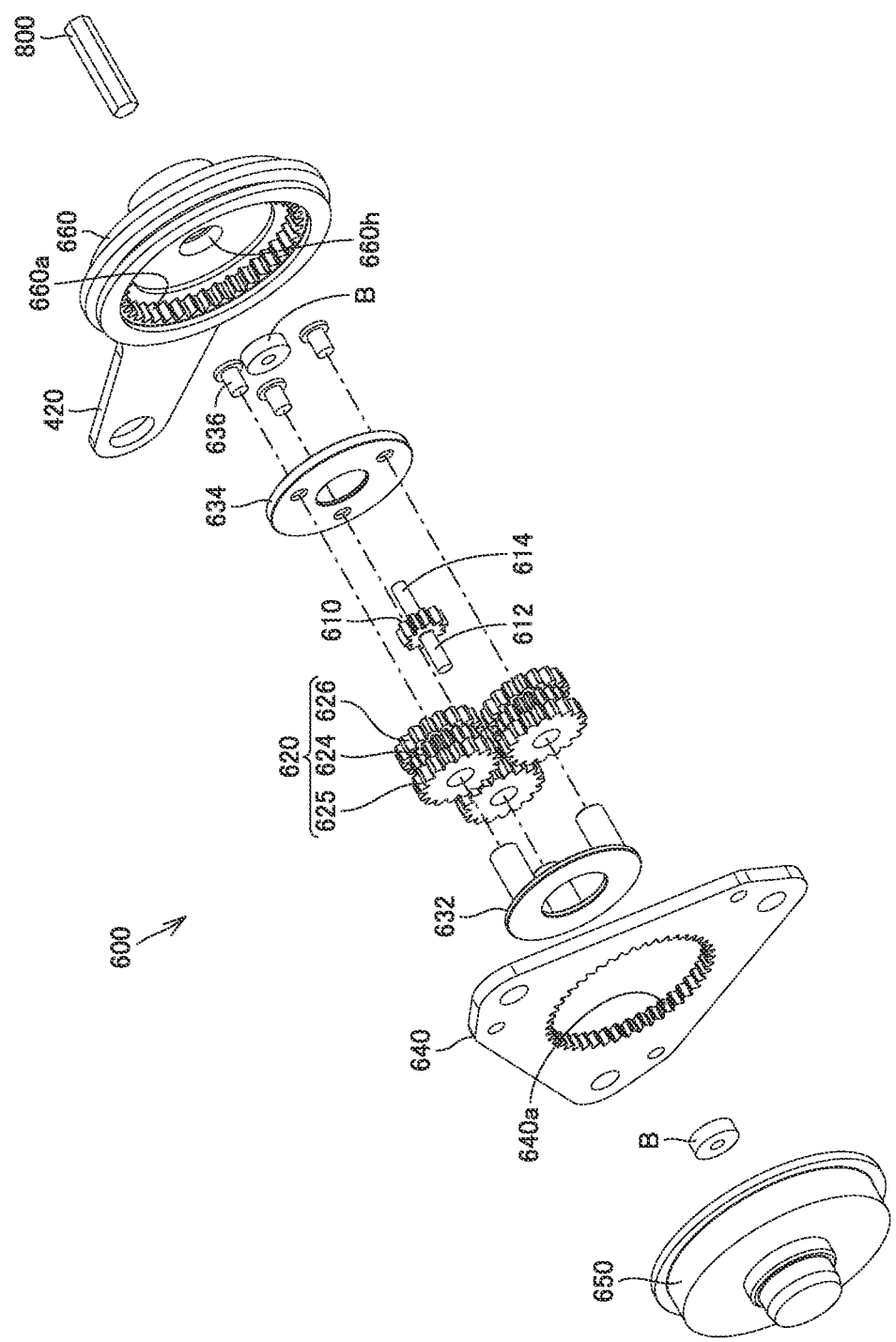
FIG. 6 is an exploded perspective view of a planetary gear mechanism.
Figure 7:
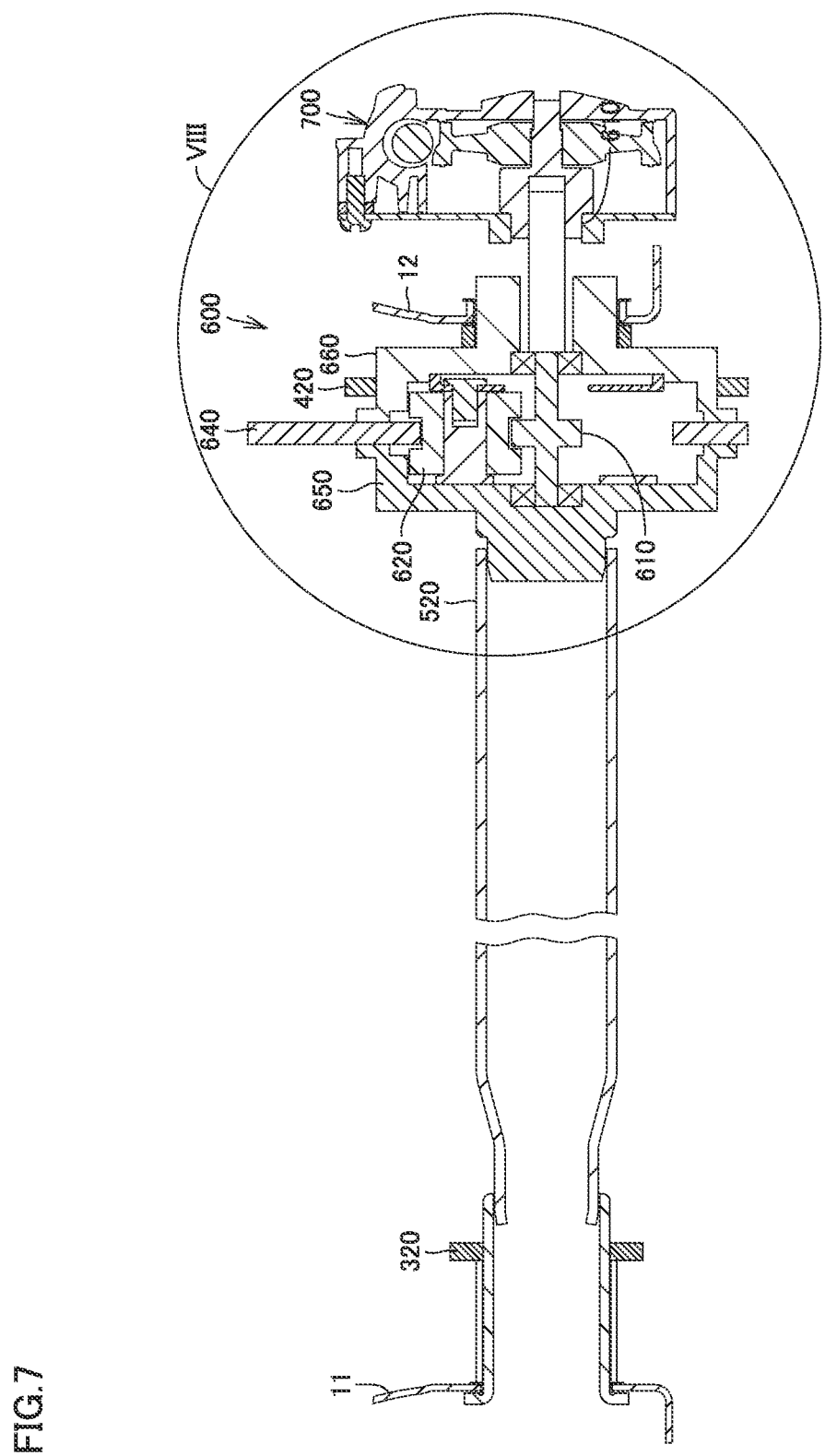
FIG. 7 is a cross-sectional view along a line VII-VII in FIG. 2.

FIG. 2 is a plan view of the cushion frame and the seat lifter. FIG. 3 is a rear view of the cushion frame and the seat lifter. FIG. 4 is a perspective view of the cushion frame and the seat lifter. FIG. 5 is a perspective view of the cushion frame and the seat lifter from a different angle than in FIG. 4. FIG. 6 is an exploded perspective view of a planetary gear mechanism.

As shown in FIGS. 1 to 6, seat lifter 50 in the present embodiment includes an inner slide rail 100, an outer slide rail 200, an inner link 300, an outer link 400, a coupling rod 500, a planetary gear mechanism 600, a drive unit 700, and a power transmission rod 800.

Inner slide rail 100 is a mechanism that causes inner lower arm 11 to slide with respect to the floor. Inner slide rail 100 is disposed below inner lower arm 11. Inner slide rail 100 includes an inner lower rail 110 and an inner upper rail 120.

Inner lower rail 110 is fixed to the floor. Inner lower rail 110 is shaped to extend in the fore/aft direction.

Inner upper rail 120 is slidable in the fore/aft direction with respect to inner lower rail 110.

Outer slide rail 200 is a mechanism that causes outer lower arm 12 to slide with respect to the floor. Outer slide rail 200 is disposed below outer lower arm 12. Outer slide rail 200 has a similar structure to inner slide rail 100. That is, outer slide rail 200 includes an outer lower rail 210 fixed to the floor, and an outer upper rail 220 slidable in the fore/aft direction with respect to outer lower rail 210.

Inner link 300 is a member for changing a height position of inner lower arm 11 with respect to the floor (inner slide rail 100). In the present embodiment, inner link 300 includes an inner front link 310 and an inner rear link 320.

A lower end portion of inner front link 310 is coupled to a front portion of inner upper rail 120. Specifically, inner front link 310 is connected to inner upper rail 120 so as to be pivotable about the lower end portion of inner front link 310 with respect to inner upper rail 120. An upper end portion of inner front link 310 is connected to a front coupling rod 510 which will be described later.

A lower end portion of inner rear link 320 is coupled to a rear portion of inner upper rail 120. Specifically, inner rear link 320 is connected to inner upper rail 120 so as to be pivotable about the lower end portion of inner rear link 320 with respect to inner upper rail 120. An upper end portion of inner rear link 320 is connected to a rear coupling rod 520 which will be described later.

Outer link 400 is a member for changing a height position of outer lower arm 12 with respect to the floor (outer slide rail 200). In the present embodiment, outer link 400 includes an outer front link 410 and an outer rear link 420.

A lower end portion of outer front link 410 is coupled to a front portion of outer upper rail 220. Specifically, outer front link 410 is connected to outer upper rail 220 so as to be pivotable about the lower end portion of outer front link 410 with respect to outer upper rail 220. An upper end portion of outer front link 410 is connected to front coupling rod 510.

A lower end portion of outer rear link 420 is coupled to a rear portion of outer upper rail 220. Specifically, outer rear link 420 is connected to outer upper rail 220 so as to be pivotable about the lower end portion of outer rear link 420 with respect to outer upper rail 220. An upper end portion of outer rear link 420 is connected to an outer movable internal gear 660 which will be described later.

Coupling rod 500 is a rod that couples inner link 300 to outer link 400 so as to cause inner link 300 and outer link 400 to rotate together. In the present embodiment, coupling rod 500 includes front coupling rod 510 and rear coupling rod 520.

Front coupling rod 510 couples the upper end portion of inner front link 310 to the upper end portion of outer front link 410. An inner end portion of front coupling rod 510 in the width direction is connected to a front portion of inner lower arm 11. An outer end portion of front coupling rod 510 in the width direction is connected to a front portion of outer lower arm 12. Front coupling rod 510 is formed in a cylindrical shape.

Rear coupling rod 520 couples the upper end portion of inner rear link 320 to the upper end portion of outer rear link 420. An inner end portion of rear coupling rod 520 in the width direction is connected to a rear portion of inner lower arm 11. An outer end portion of rear coupling rod 520 in the width direction is connected to planetary gear mechanism 600. Rear coupling rod 520 rotates together with inner rear link 320 and outer rear link 420. Rear coupling rod 520 is formed in a cylindrical shape.

Planetary gear mechanism 600 is connected to rear coupling rod 520. Planetary gear mechanism 600 is capable of causing rear coupling rod 520 to rotate about its central axis relative to inner lower arm 11 and outer lower arm 12. Planetary gear mechanism 600 is disposed between inner lower arm 11 and outer lower arm 12. In the present embodiment, planetary gear mechanism 600 is connected to the outer end portion of rear coupling rod 520. Planetary gear mechanism 600 is connected to outer lower arm 12 from the inner side in the width direction.

Planetary gear mechanism 600 has the function of reinforcing the lower end portion of outer side frame 22. In the present embodiment, when a tensile load acts on belt insertion portion 23a via seat belt 2, a relatively high load acts on the lower end portion of outer side frame 22. Therefore, planetary gear mechanism 600 is connected to outer lower arm 12 from the inner side in the width direction.

As shown in FIG. 6, planetary gear mechanism 600 includes a sun gear 610, at least one planetary gear 620 (three planetary gears 620 in the present embodiment), a carrier 632, a carrier cover 634, carrier fixing bolts 636, a fixed internal gear 640, an inner movable internal gear 650, and outer movable internal gear 660.

Figure 8:
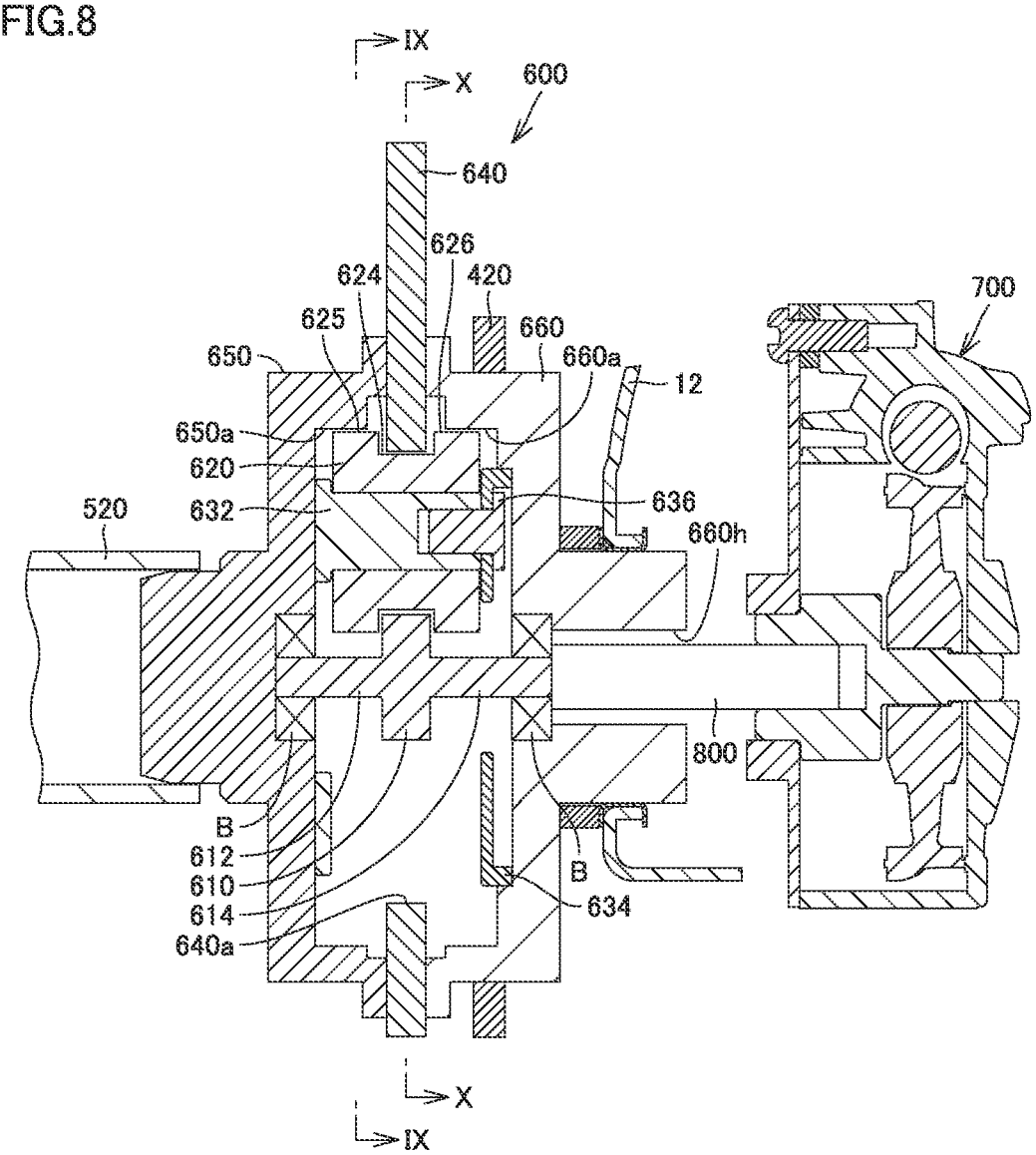
FIG. 8 is an enlarged view of an area indicated by a solid line VIII in FIG. 7.

Sun gear 610 rotates about the central axis of rear coupling rod 520. An inner shaft portion 612 and an outer shaft portion 614 are connected to sun gear 610. As shown in FIG. 8, inner shaft portion 612 is held to inner movable internal gear 650 via a bearing B. Outer shaft portion 614 is held to outer movable internal gear 660 via bearing B.

Each planetary gear 620 circles around sun gear 610 while meshing with sun gear 610. In other words, planetary gear 620 revolves (circles) around sun gear 610 about a rotational central axis of sun gear 610, while rotating about a rotational central axis of planetary gear 620. Each planetary gear 620 is disposed about the rotational central axis of sun gear 610. In the present embodiment, three planetary gears 620 are disposed at regular intervals along the direction of rotation of sun gear 610. Each planetary gear 620 includes a fixed gear portion 624, an inner gear portion. 625, and an outer gear portion 626.

Fixed gear portion 624 is formed at a central portion of planetary gear 620 in the width direction (a direction of the rotational central axis of planetary gear 620).

Figure 9:
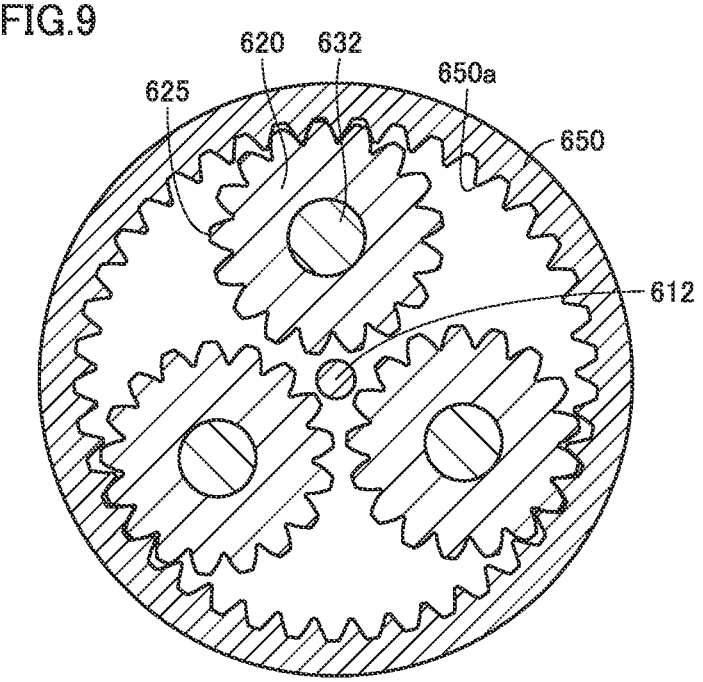
FIG. 9 is a cross-sectional view along a line IX-IX shown in FIG. 8.
Figure 10:
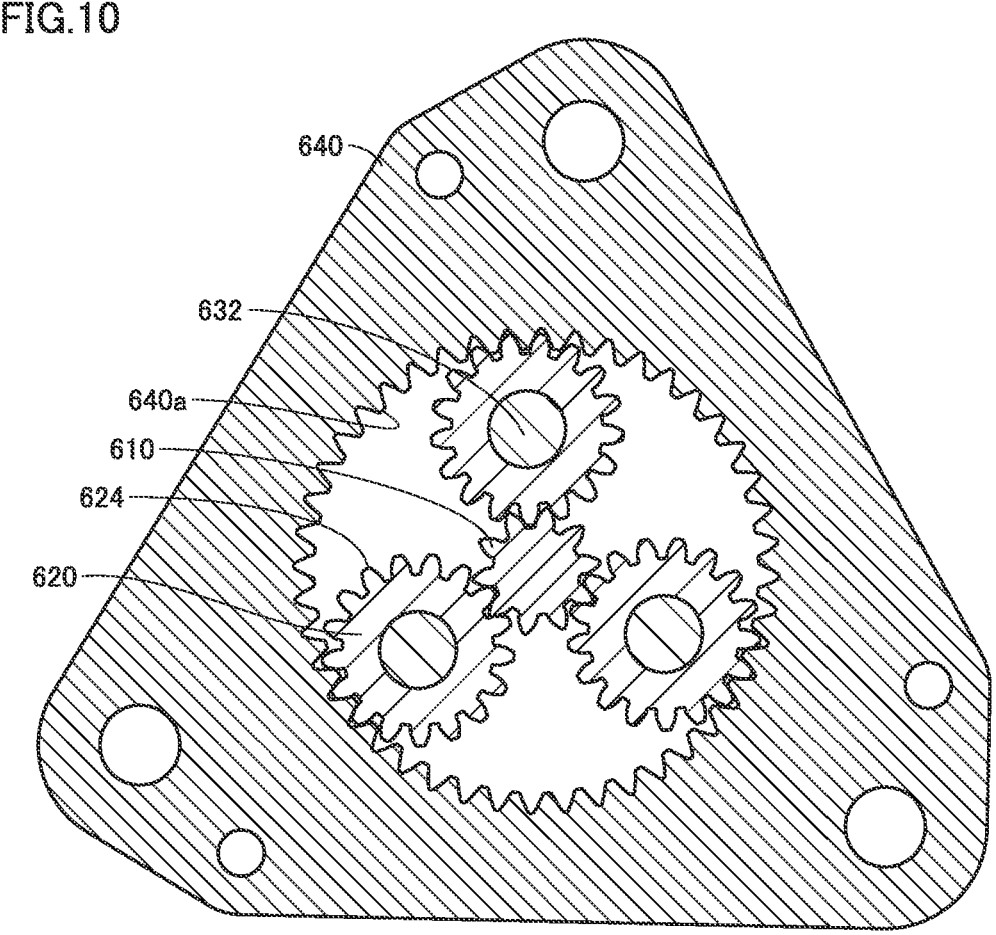
FIG. 10 is a cross-sectional view along a line X-X shown in FIG. 8.

Inner gear portion 625 is formed at an inner end portion of planetary gear 620 in the width direction. Inner gear portion 625 has the same number of teeth as fixed gear portion 624. As shown in FIGS. 8 and 9, inner gear portion 625 is disposed about inner shaft portion 612.

Outer gear portion 626 is formed at an outer end portion of planetary gear 620 in the width direction. Outer gear portion 626 has the same number of teeth as inner gear portion 625. As shown in FIG. 8, outer gear portion 626 is disposed about outer shaft portion 614. The length of outer gear portion 626 in the width direction (a lateral direction in FIG. 8) is preferably set to be greater than the length of inner gear portion 625 in the same direction.

Each planetary gear 620 is held to carrier 632. Carrier cover 634 holds each planetary gear 620 between itself and carrier 632. Carrier cover 634 is fixed to carrier 632 with carrier fixing bolts 636.

Fixed internal gear 640 is fixed to outer lower arm 12. As shown in FIGS. 1 and 2, fixed internal gear 640 is fixed to outer lower arm 12 by a coupling member 642 so as not to be rotatable relative to outer lower arm 12. Fixed internal gear 640 has internal teeth 640a that mesh with fixed gear portion 624 of each planetary gear 620.

Inner movable internal gear 650 has internal teeth 650a that mesh with inner gear portion 625 of each planetary gear 620. Inner movable internal gear 650 has a different number of teeth than fixed internal gear 640. Inner movable internal gear 650 is rotatable about the rotational central axis of sun gear 610 relative to fixed internal gear 640. Inner movable internal gear 650 is disposed between fixed internal gear 640 and inner lower arm 11. Inner movable internal gear 650 is rotatable together with inner rear link 320 relative to fixed internal gear 640. Specifically, inner movable internal gear 650 is connected to the outer end portion of rear coupling rod 520 so as to rotate together with rear coupling rod 520. Inner rear link 320 is fixed to the inner end portion of rear coupling rod 520 so that rear coupling rod 520 and inner rear link 320 rotate together.

Outer movable internal gear 660 has inner teeth 660a that mesh with outer gear portion 626 of each planetary gear 620. Outer movable internal gear 660 has the same number of teeth as inner movable internal gear 650. Outer movable internal gear 660 is rotatable about the rotational central axis of sun gear 610 relative to fixed internal gear 640. Outer movable internal gear 660 is disposed between fixed internal gear 640 and outer lower arm 12. Outer movable internal gear 660 is rotatable together with outer rear link 420 relative to fixed internal gear 640. Specifically, outer rear link 420 is fixed to outer movable internal gear 660 so that outer movable internal gear 660 and outer rear link 420 rotate together. Outer movable internal gear 660 is connected to outer lower arm 12 from the inner side in the width direction. Outer movable internal gear 660 is provided with an insertion hole 660h through which power transmission rod 800 is inserted.

Drive unit 700 is capable of driving planetary gear mechanism 600, In the present embodiment, a motor is used as drive unit 700. However, drive unit 700 may be configured to manually drive planetary gear mechanism 600. Drive unit 700 is disposed outside outer lower arm 12 in the width direction. As shown in FIG. 3, an outer end portion of drive unit 700 in the width direction is located inside an outer end portion of outer slide rail 200 in the width direction.

Power transmission rod 800 is a member that transmits output from drive unit 700 to planetary gear mechanism 600. Power transmission rod 800 couples an output shaft of drive unit 700 to outer shaft portion 614. Thus, driving of drive unit 700 effects rotation of sun gear 610.

An operation of seat lifter 50 will now be described.

First, when drive unit 700 is driven, sun gear 610 rotates together with power transmission rod 800. As a result, each planetary gear 620 rotates around sun gear 610.

Then, due to the difference in the number of teeth between fixed internal gear 640 and each of movable internal gears 650, 660, each of movable internal gears 650, 660 rotates about the rotational central axis of sun gear 610 relative to fixed internal gear 640.

Along with inner movable internal gear 650 and outer movable internal gear 660, outer rear link 420, rear coupling rod 520 and inner rear link 320 rotate together. Specifically, inner rear link 320 rotates about its lower end portion relative to inner upper rail 120, and outer rear link 420 rotates about its lower end portion relative to outer upper rail 220. At this time, inner front link 310 rotates about its lower end portion relative to inner upper rail 120, and outer front link 410 rotates about its lower end portion relative to outer upper rail 220. As a result, cushion frame 10 and back frame 20 move up and down with respect to the floor.

In seat lifter 50 described above, as planetary gear mechanism 600 is disposed between inner lower arm 11 and outer lower arm 12, and drive unit 700 is disposed outside outer lower arm 12, an amount of outward protrusion of planetary gear mechanism 600 and drive unit 700 in the width direction is reduced.

In addition, as planetary gear mechanism 600 is connected to outer lower arm 12 from the inner side in the width direction, a connection portion between outer lower arm 12 and outer side frame 22 is reinforced by planetary gear mechanism 600. Thus, the connection portion has increased strength.

In addition, as outer rear link 420, rear coupling rod 520 and inner rear link 320 rotate together along with each of movable internal gears 650, 660, the upward and downward movement of cushion frame 10 can be achieved by single planetary gear mechanism 600.

In addition, as the length of outer gear portion 626 in the width direction (the lateral direction in FIG. 8) is set to be greater than the length of inner gear portion 625 in the same direction, outer movable internal gear 660 can have increased strength.

It should be understood that the embodiment disclosed herein is illustrative and non-restrictive in every respect. The scope of the present disclosure is defined by the terms of the claims, rather than the description of the embodiment above, and further includes any modifications within the scope and meaning equivalent to the terms of the claims.

For example, drive unit 700 may be disposed outside inner lower arm 11 in the width direction. In this case, an insertion hole through which power transmission rod 800 is inserted is provided in a central portion of inner movable internal gear 650, and power transmission rod 800 is connected to outer shat portion 614 through the insertion hole while being disposed in rear coupling rod 520.

Planetary gear mechanism 600 may be provided at an intermediate portion of rear coupling rod 520. That is, rear coupling rod 520 may be divided into an inner rod that couples inner lower arm 11 to inner movable internal gear 650, and an outer rod that couples outer lower arm 12 to outer movable internal gear 660. In this case, the upper end portion of outer rear link 420 is preferably connected to the outer rod.

It is understood by a person skilled in the art that the embodiment described above is provided as specific examples of the following aspects.

A seat lifter according to an aspect of the present disclosure includes: an inner link for changing a height position of an inner lower arm with respect to a floor of a vehicle, the inner lower arm being disposed on an inner side in a width direction of the vehicle; an outer link for changing a height position of an outer lower arm with respect to the floor, the outer lower arm being disposed outside the inner lower arm in the width direction; a coupling rod that couples the inner link to the outer link so as to cause the inner link and the outer link to rotate together; a planetary gear mechanism connected to the coupling rod and capable of causing the coupling rod to rotate relative to the inner lower arm and the outer lower arm; a drive unit capable of driving the planetary gear mechanism; and a power transmission rod that transmits power of the drive unit to the planetary gear mechanism, the planetary gear mechanism being disposed between the inner lower arm and the outer lower arm, and the drive unit being disposed outside the inner lower arm in the width direction or outside the outer lower arm in the width direction.

In this seat lifter, as the planetary gear mechanism is disposed between the inner lower arm and the outer lower arm, and the drive unit is disposed outside the inner lower arm or outside the outer lower arm, an amount of outward protrusion of the planetary gear mechanism and the drive unit in the width direction is reduced.

In this case, preferably, the planetary gear mechanism includes a sun gear connected to a tip end of the power transmission rod, a planetary gear that rotates around the sun gear while meshing with the sun gear, a fixed internal gear having internal teeth that mesh with the planetary gear, and fixed to one of the inner lower arm and the outer lower arm so as not to be rotatable relative to the inner lower arm and the outer lower arm, an inner movable internal gear having internal teeth that mesh with the planetary gear, and rotatable together with the inner link relative to the fixed internal gear, and an outer movable internal gear having internal teeth that mesh with the planetary gear, and rotatable together with the outer link relative to the fixed internal gear, the fixed internal gear is disposed between the inner lower arm and the outer lower arm, the inner movable internal gear is disposed between the fixed internal gear and the inner lower arm, and the outer movable internal gear is disposed between the fixed internal gear and the outer lower arm, and rotates together with the inner movable internal gear.

In this aspect, as the movable internal gears rotate together, the inner lower arm and the outer lower arm move up and down simultaneously.

Preferably, the planetary gear includes a fixed gear portion that meshes with the fixed internal gear, an inner gear portion having a same number of teeth as the fixed gear portion, and that meshes with the inner movable internal gear, and an outer gear portion having a same number of teeth as the inner gear portion, and that meshes with the outer movable internal gear, and the inner movable internal gear and the outer movable internal gear have a different number of teeth than the fixed internal gear.

Preferably, the outer lower arm is connectable to a lower end portion of an outer side frame of a pair of side frames included in a back frame, the outer side frame being located closer to a belt insertion portion through which a seat belt is inserted, the inner movable internal gear is connected to an outer end portion of the coupling rod in the width direction, and the outer movable internal gear is connected to the outer lower arm from an inner side in the width direction.

In this aspect, as a connection portion between the outer lower arm and the outer side frame is reinforced by the planetary gear mechanism, the connection portion has increased strength.

In this case, preferably, the drive unit is disposed outside the outer lower arm in the width direction.

Preferably, the inner link is fixed to the coupling rod, and the outer link is fixed to the outer movable internal gear.

The seat lifter may further include an inner slide rail that causes the inner lower arm to slide with respect to the floor, and an outer slide rail that causes the outer lower arm to slide with respect to the floor. Preferably, the inner slide rail includes an inner lower rail fixed to the floor, and an inner upper rail slidable with respect to the inner lower rail, the outer slide rail includes an outer lower rail fixed to the floor, and an outer upper rail slidable with respect to the outer lower rail, the inner link is coupled to the inner upper rail so as to be rotatable with respect to the inner upper rail, and the outer link is coupled to the outer upper rail so as to be rotatable with respect to the outer upper rail.

Preferably, an outer end portion of the drive unit in the width direction is located inside an outer end portion of the outer slide rail in the width direction.

As described above, according to the present disclosure, a seat lifter capable of reducing an amount of outward protrusion of a planetary gear mechanism and a drive unit in a width direction of a vehicle can be provided.

What is claimed is:

1. A seat lifter comprising:
    an inner link for changing a height position of an inner lower arm with respect to a floor of a vehicle, the inner lower arm being disposed on an inner side in a width direction of the vehicle;
    an outer link for changing a height position of an outer lower arm with respect to the floor, the outer lower arm being disposed outside the inner lower arm in the width direction;
    a coupling rod that couples the inner link to the outer link so as to cause the inner link and the outer link to rotate together;
    a planetary gear mechanism connected to the coupling rod and capable of causing the coupling rod to rotate relative to the inner lower arm and the outer lower arm;
    a drive unit capable of driving the planetary gear mechanism; and
    a power transmission rod that transmits power of the drive unit to the planetary gear mechanism,
    the planetary gear mechanism being disposed between the inner lower arm and the outer lower arm, and
    the drive unit being disposed outside the inner lower arm in the width direction or outside the outer lower arm in the width direction.

2. The seat lifter according to claim 1, wherein
    the planetary gear mechanism includes
        a sun gear connected to a tip end of the power transmission rod,
        a planetary gear that rotates around the sun gear while meshing with the sun gear,
        a fixed internal gear having internal teeth that mesh with the planetary gear, and fixed to one of the inner lower arm and the outer lower arm so as not to be rotatable relative to the inner lower arm and the outer lower arm, an inner movable internal gear having internal teeth that mesh with the planetary gear, and rotatable together with the inner link relative to the fixed internal gear, and an outer movable internal gear having internal teeth that mesh with the planetary gear, and rotatable together with the outer link relative to the fixed internal gear, the fixed internal gear is disposed between the inner lower arm and the outer lower arm, the inner movable internal gear is disposed between the fixed internal gear and the inner lower arm, and the outer movable internal gear is disposed between the fixed internal gear and the outer lower arm, and rotates together with the inner movable internal gear.

3. The seat lifter according to claim 2, wherein
the planetary gear includes
- a fixed gear portion that meshes with the fixed internal gear,
- an inner gear portion having a same number of teeth as the fixed gear portion, and that meshes with the inner movable internal gear, and
- an outer gear portion having a same number of teeth as the inner gear portion, and that meshes with the outer movable internal gear, and the inner movable internal gear and the outer movable internal gear have a different number of teeth than the fixed internal gear.

4. The seat lifter according to claim 2, wherein
the outer lower arm is connectable to a lower end portion of an outer side frame of a pair of side frames included in a back frame, the outer side frame being located closer to a belt insertion portion through which a seat belt is inserted, the inner movable internal gear is connected to an outer end portion of the coupling rod in the width direction, and the outer movable internal gear is connected to the outer lower arm from an inner side in the width direction.

5. The seat lifter according to claim 4, wherein
the drive unit is disposed outside the outer lower arm in the width direction.

6. The seat lifter according to claim 4, wherein
the inner link is fixed to the coupling rod, and
the outer link is fixed to the outer movable internal gear.

7. The seat lifter according to claim 4, further comprising:
an inner slide rail that causes the inner lower arm to slide with respect to the floor; and
an outer slide rail that causes the outer lower arm to slide with respect to the floor, wherein
the inner slide rail includes
- an inner lower rail fixable to the floor, and
- an inner upper rail slidable with respect to the inner lower rail, the outer slide rail includes
- an outer lower rail fixable to the floor, and
- an outer upper rail slidable with respect to the outer lower rail, the inner link is coupled to the inner upper rail so as to be rotatable with respect to the inner upper rail, and
the outer link is coupled to the outer upper rail so as to be rotatable with respect to the outer upper rail.

8. The seat lifter according to claim 7, wherein
an outer end portion of the drive unit in the width direction is located inside an outer end portion of the outer slide rail in the width direction.

* * * * *